(12) United States Patent
Bruenggel et al.

(10) Patent No.: US 12,505,915 B2
(45) Date of Patent: Dec. 23, 2025

(54) PROCESSING OF IMAGES CONTAINING OVERLAPPING PARTICLES

(71) Applicant: Roche Diagnostics Operations, Inc., Indianapolis, IN (US)

(72) Inventors: Nils Bruenggel, Muri (CH); Patrick Conway, Cham (CH); Pascal Vallotton, Buchs (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 559 days.

(21) Appl. No.: 17/813,194

(22) Filed: Jul. 18, 2022

(65) Prior Publication Data

US 2023/0028525 A1  Jan. 26, 2023

(30) Foreign Application Priority Data

Jul. 21, 2021  (EP) .................................... 21187034

(51) Int. Cl.
*G16H 30/40* (2018.01)
*G06T 5/50* (2006.01)

(52) U.S. Cl.
CPC ............... *G16H 30/40* (2018.01); *G06T 5/50* (2013.01); *G06T 2207/20081* (2013.01); *G06T 2207/20212* (2013.01)

(58) Field of Classification Search
CPC ......... G06T 7/0012; G06T 2207/20081; G06T 2207/30024; G06T 2207/20084;

(Continued)

(56) References Cited

U.S. PATENT DOCUMENTS 8,942,441 B2 * 1/2015 Nielsen ..................... G06T 7/12
382/199

FOREIGN PATENT DOCUMENTS

| JP | 2016018538 | 2/2016 |
| JP | 2020530925 | 10/2020 |
| JP | 2020201243 | 12/2020 |

OTHER PUBLICATIONS

Lu, Zhi, Gustavo Carneiro, and Andrew P. Bradley. "An improved joint optimization of multiple level set functions for the segmentation of overlapping cervical cells." IEEE transactions on image processing 24.4 (2015): 1261-1272 (Year: 2015).*

(Continued)

*Primary Examiner* — Courtney Joan Nelson
(74) *Attorney, Agent, or Firm* — Woodard, Emhardt, Henry, Reeves & Wagner, LLP

(57) ABSTRACT

A computer-implemented method of generating training data to be used to train a machine learning model for generating a segmentation mask of an image containing overlapping particles. Training data is generated from sparse particle images which contain no overlaps. Generating masks for non-overlapping particles is generally not a problem if the particles can be identified clearly; in many cases simple methods such as thresholding already yield usable masks. The sparse images can then be combined to images which contain artificial overlaps. The same can be done for the masks as well which yields a large amount of training data, because of the many combinations which can be created from just a small set of images. The method is simple yet effective and can be adapted to many domains for example by adding style-transfer to the generated images or by including additional augmentation steps.

15 Claims, 10 Drawing Sheets

(58) Field of Classification Search
CPC ........... G06T 2207/10056; G06T 11/00; G06T 7/174; G06T 7/12; G06T 2219/004; G06T 3/4046; G06T 2207/20212; G06T 5/50; G06V 10/82; G06V 10/764; G06V 20/698; G06V 2201/03; G06V 10/44; G06V 20/695; G06V 10/26; G06V 10/774; G06V 20/69; G16H 30/40; G16H 50/20; G16H 10/40; G06N 20/00; G06N 3/08; G06F 18/2431; G06F 18/21; G06F 18/214

See application file for complete search history.

(56) References Cited

OTHER PUBLICATIONS

Y. Song et al., "Accurate Cervical Cell Segmentation from Overlapping Clumps in Pap Smear Images," in IEEE Transactions on Medical Imaging, vol. 36, No. 1, pp. 288-300, Jan. 2017, doi: 10.1109/TMI.2016.2606380 (Year: 2017).*

Hollandi, R., et al. "A deep learning framework for nucleus segmentation using image style transfer. bioRxiv." (2019): 580605 (Year: 2019).*

Phan, Trong Huy, and Kazuma Yamamoto. "Resolving class imbalance in object detection with weighted cross entropy losses." arXiv preprint arXiv:2006.01413 (2020) (Year: 2020).*

Meiji, Adviser et al., Particle shape evaluation using unsupervised domain, 13th Forum on Data Engineering and Information Management, 2021, 9 pp., Online https://db-event.jpn.org/deim2021/index.html, English abstract.

Toyoda, Akira et al., A note on detection of distress regions in subway tunnels from laser data—Visualization of distress regions with fully convolutional networks, ITE Technical Reports, 2019, pp. 295-299, vol. 43, No. 5.

Anonymous, Image segmentation, Wikipedia, 2022, retrieved from https://en.wikipedia.org/wiki/Image_segmentation, 23 pp.

Anonymous, Measure properties of image regions, METLAB regionprops, 2022, retrieved from https://www.mathworks.com/help/images/ref/regionprops.html, 13 pp.

European Search Report issued Jan. 17, 2022, in Application No. 21187034.0, 2 pp.

Gatys, Leon A. et al., Image Style Transfer Using Convolutional Neural Networks, IEEE Conference on Computer Vision and Pattern Recognition, 2016, pp. 2414-2423.

Girshick, Ross et al., Rich feature hierarchies for accurate object detection and semantic segmentation, Tech report (v5), arXiv, 2013, 21 pp., 1311, 2524.

Hollandi, Reka et al., A deep learning framework for nucleus segmentation using image style transfer, bioRxiv, 2019, 24 pp.

Karras, Tero et al., Analyzing and Improving the Image Quality of StyleGAN, Proceedings of the IEEE/CVF Conference on Computer Vision and Pattern Recognition, 2020, pp. 8110-8119.

Li, Yijun et al., Universal style transfer via feature transforms, 2017, 11 pp., 1705, 08086.

Lu, Zhi et al., An Improved Joint Optimization of Multiple Level Set Functions for the Segmentation of Overlapping Cervical Cells, IEEE Transactions on Image Processing, 2015, pp. 1261-1272, vol. 24, No. 4.

Phan, Trong Huy and Yamamoto, Kazuma, Resolving Class Imbalance in Object Detection with Weighted Cross Entropy Losses, Arsiv.org, 2020, 13 pp., Cornell University Library, Ithaca, NY.

Praramadhan, Anugrah Akbar and Saputra, Guntur Eka, Cycle Generative Adversarial Networks Algorithm With Style Transfer For Image Generation, arXiv, 2021, 12 pp., :2101 03921 Abstract.

Ronneberger, Olaf et al., U-Net: Convolutional Networks for Biomedical Image Segmentation, Medical Image Computing and Computer-Assisted Intervention (MICCAI), 2015, pp. 234-241, vol. 9351, Spring LNCS.

Vallotton, Pascal et al., Segmentation and tracking individual Pseudomonas aeruginosa bacteria in dense populations of motile cells, IEEE 24th International Conference Image and Vision Computing New Zealand, 2009, pp. 221-225.

* cited by examiner

PROCESSING OF IMAGES CONTAINING OVERLAPPING PARTICLES

CROSS-REFERENCE TO RELATED APPLICATIONS

This application claims priority to European Patent Application No. 21187034.0, filed 21 Jul. 2021, the disclosure of which is hereby incorporated by reference in its entirety.

TECHNICAL FIELD

The present disclosure relates to a computer-implemented method of generating training data to be used to train a machine learning model for generating a segmentation mask of an image containing overlapping particles, as well as a computer-implemented method for generating a machine-learning model, and a method for generating a segmentation mask of an image containing overlapping particles.

BACKGROUND

In many medical contexts, it is vital for clinicians and scientists to be able reliably to analyse images of cells and populations of cells. Such analysis can include the counting of cells, quantification of the mean cellular volume, and measurement of relevant cell shapes. These analysis techniques can be straightforwardly automated when the images include sparse cell populations. However, in denser cell populations, there are often overlapping cells in slide images, which make these tasks far more problematic. This is particularly true for, e.g., populations of red blood cells, for which overlapping and/or clumping are particularly prevalent issues.

Machine-learning techniques have greatly aided in the analysis of such images containing overlapping cells. However, in order to train such models, ground truth information is required, i.e., "correct" segmentation masks for images containing overlapping cells. At present, the generation of such ground truth information is extremely time-consuming, and typically demands manual and painstaking annotation of the images by trained clinicians, before said images can be used to train the machine-learning model.

The present disclosure aims to overcome this difficulty in preparing ground truth information, thereby increasing the efficiency with which training data may be generated, and therefore the efficiency with which robust machine-learning models may be generated. While a primary application of the present disclosure relates to images containing overlapping cells, it should be noted that it is equally applicable to any other image containing overlapping particles.

SUMMARY

Although the embodiments of the present disclosure are not limited to specific advantages or functionality, it is noted that in accordance with the present disclosure a computer-implemented method of generating training data to be used to train a machine learning model for generating a segmentation mask of an image containing overlapping particles is presented, as well as a computer-implemented method for generating a machine-learning model, and a method for generating a segmentation mask of an image containing overlapping particles.

Broadly speaking, the present application is directed towards a process by which training data for a machine learning model can be generated. At a high-level, the data is generated by obtaining segmentation masks for images of non-overlapping particles. Then, the images of non-overlapping particles are overlapped to generate simulated combination images. Appropriate segmentation masks for these simulated combination images are then generated by overlapping the segmentation masks for each of the constituent images containing non-overlapping particles.

It has been shown (see later) that training data which is generated in this manner yields highly accurate segmentation masks from images of overlapping particles.

More specifically, according to a first aspect of the present disclosure, a computer-implemented method for generating training data to be used to train a machine learning model for generating a segmentation mask of an image containing overlapping particles is provided, the method comprising the steps of: acquiring a plurality of images containing non-overlapping particles; obtaining a plurality of segmentation masks, each segmentation mask corresponding to a respective image of the plurality of acquired images; generating a plurality of simulated combination images by combining images of the plurality of images, the simulated combination images including overlapping particles; and for each simulated combination image, generating a simulated segmentation mask by combining the segmentation masks obtained for each of the constituent images which were combined to generate that simulated combination image.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description

BRIEF DESCRIPTION OF THE DRAWINGS

The following detailed description of the embodiments of the present description can be best understood when read in conjunction with the following drawings, where like structure is indicated with like reference numbers and in which.

Figure 1:
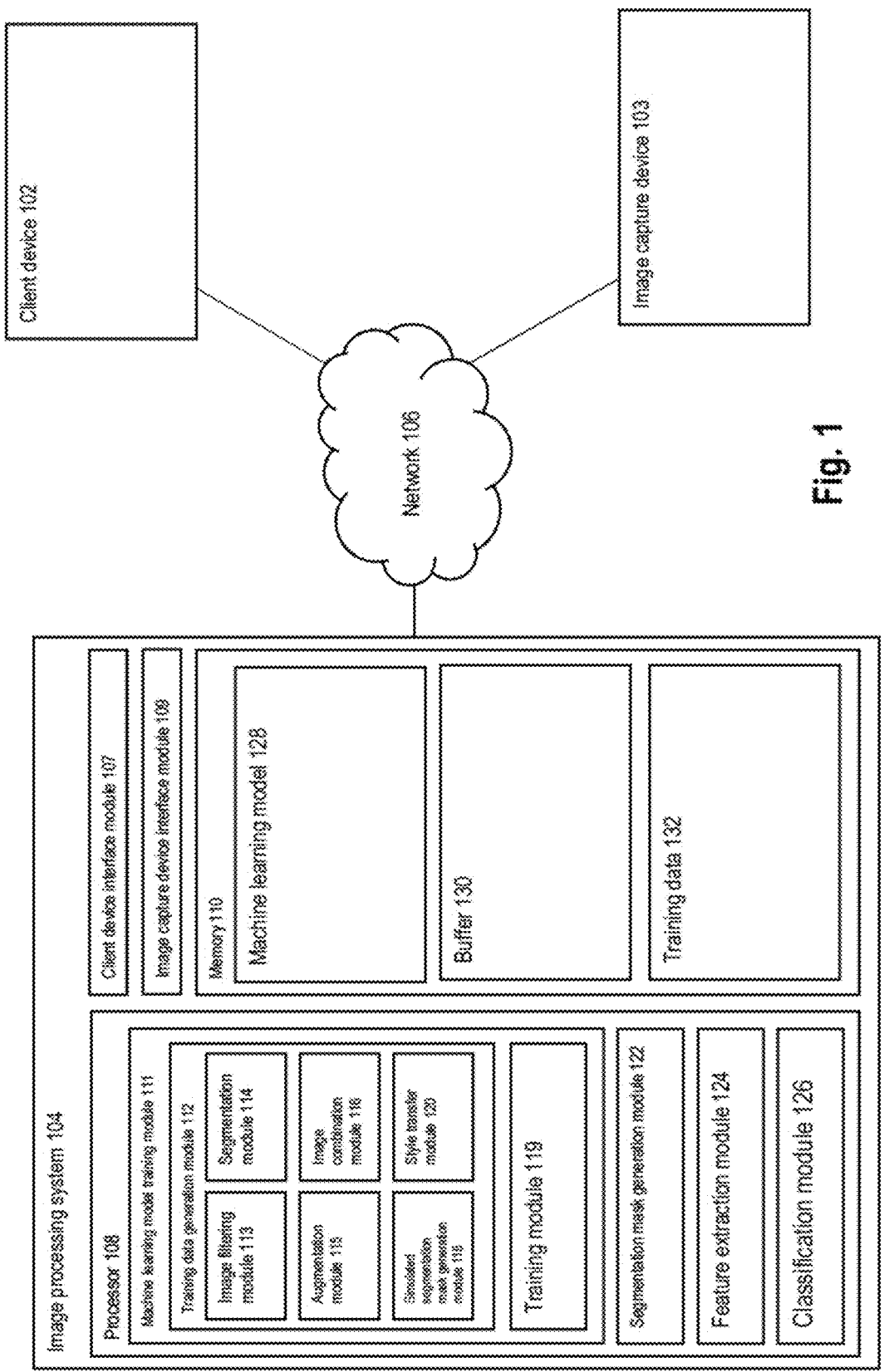
FIG. 1 shows an example of a system which may be used to execute the computer-implemented method according to an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The language used in the present application is clear, and well-understood by the skilled person. However, for the avoidance of doubt, we set out below some definitions to aid with the interpretation of the claims:

A "machine-learning model" is an analytical model which relies on the principles of machine-learning in order to generate a meaningful output from an input. Specifically, machine-learning models are those models whose performance is able to improve with experience, and which are able to "learn", and therefore improve in, e.g., accuracy of the results compared to manual human processing, as they are applied to more and more training data. Machine-learning models may be either classification models (in which an input is classified into a certain category) or regression models (in which a continuous value for a parameter is predicted based on an input). The present disclosure relates to models which rely on supervised learning, i.e., in which the training data includes the inputs and "correct" outputs associated with those inputs. This may be referred to as ground truth information. In some cases, the machine-learning models may rely on "semi-supervised" learning, in which the training data includes a mixture of only input data, as well as data including the inputs and "correct" outputs as mentioned above. Often, machine-learning models operate on the principle of mathematical optimization. Examples of machine-learning models which may benefit from the training data generation method of the first aspect of the present disclosure employed in the present disclosure are U-Net algorithms as described in Ronneberger, Olaf et al. "U-Net: Convolutional Networks for Biomedical Image Segmentation" arXiv:1505.04597 (2015), Fast R-CNN, Faster R-CNN, and YOLO algorithms as described in Girshick, Ross et al. "Rich feature hierarchies for accurate object detection and semantic segmentation" arXiv:1311.2524 (2013).

"Training" a machine-learning model is the process by which the performance of the machine-learning model improves. In the present disclosure, "training data" is used to train the model. Training data comprises a set of data in which inputs are associated with the "correct" outputs. This may be referred to as "labelled" data. For example, in the present disclosure, the training data includes pairs of simulated combination images (input), and the simulated segmentation masks (output). These are typically stored in association with each other in order to ensure training efficiency.

In the context of the present disclosure "acquiring" the plurality of images of non-overlapping particles may involve either acquiring the images directly, i.e., by capturing the images using some kind of image capture device such as a camera. Alternatively, "acquiring" the plurality of images may refer to receiving the plurality of images after they have been captured in a previous step. More details about the acquisition of these images is set out later in this application. "Images containing non-overlapping particles" should be interpreted as meaning images containing non-overlapping particles only, or images containing substantially no overlaps between the particles therein.

The present disclosure includes a step of obtaining a segmentation mask for each of the plurality of images of non-overlapping particles. Herein, the term "segmentation mask" refers to a two-dimensional array of values, each typically corresponding to a respective pixel of the image, wherein the value corresponding to the pixel provides information classifying what is shown in that pixel. The range of values which each pixel of the segmentation mask can take is typically restricted only to a small handful of values. For example, the segmentation mask may be in the form of a binary segmentation mask in which, e.g., a value of 0 means that there is no cell present in the pixel, and a value of 1 means that there is a cell present in the pixel. As we explain later on, when images containing overlapping particles are considered, the segmentation mask may take more than two values. The values of the pixels in the segmentation mask are not the same as the "pixel values" of the image (explained later). To avoid confusion, the pixel values in the segmentation masks are referred to henceforth as mask pixel values.

Further definitions may be set out throughout the text.

In some cases, it may be challenging to acquire an image which includes only non-overlapping particles. Accordingly, in order to ensure that this is the case, acquiring a plurality of images containing non-overlapping particles may comprise acquiring a plurality of images, the plurality of images including a first subset of images including non-overlapping particles; and a second subset of images including non-overlapping particles and overlapping particles; and removing the second subset of images from the plurality of images. Removal of the second subset of images may be performed manually (i.e., by an experienced clinician or scientist), or automatically. For example, an independent neural network way be trained to recognize those images containing overlapping particles, where after they may be removed. In this way, only images containing non-overlapping particles remain. This is advantageous, because it means that the segmentation masks which are obtained from the first subset of images are more accurate, since they are obtained only from non-overlapping images.

There are numerous ways in which the segmentation masks of the plurality of images may be obtained. For example, obtaining the segmentation mask for each image of the plurality of images may comprise applying an adaptive thresholding algorithm to the image. Additionally, or alternatively, obtaining the segmentation mask for each image of the plurality of images may comprise applying a Laplacian edge detection algorithm to the image as is used in, e.g., P. Vallotton, C. Sun, D. Wang, L. Turnbull, C. Whitchurch and P. Ranganathan, "Segmentation and tracking individual *Pseudomonas aeruginosa* bacteria in dense populations of motile cells," 2009 24th International Conference Image and Vision Computing New Zealand, 2009, pp. 221-225, doi: 10.1109/IVCNZ.2009.5378409. It should be noted that various image segmentation methods are well-known to the skilled person, and may be found online. See, e.g., https://en.wikipedia.org/wiki/Image_segmentation for a comprehensive list of segmentation techniques. It is typical, as outlined above, that obtaining the segmentation mask comprises obtaining a binary segmentation mask in which a mask pixel value of 1 indicates either that a cell is or isn't present at a given point in the image, and a mask pixel value of 0 indicates the opposite case. Typically, a mask pixel value of 1 indicates that a cell is present, and a mask pixel value of 0 indicates that a cell isn't present. Essentially, the segmentation mask provides something equivalent to a black and white image in which the cells are shown in white and the background in black, or vice versa.

We now discuss in more detail how the segmentation masks, simulated combination images and simulated segmentation masks are generated. This is done in reference to a first image and a second image of the plurality of images, but it will be appreciated that this may apply to more than one pair of images of the plurality of images. For example, this process may take place for every possible combination of two images of the plurality of images. Or, a random set of pairs may be determined, and the process may take place only for those determined pairs.

The plurality of images may contain a first image and a second image, each image being made up of an array of pixels, each pixel having an associated pixel value. Here, the term "pixel value" is used to refer to one or more values which are used to define the pixel. For example, in greyscale images, the pixel value may comprise a single value which defines the brightness or intensity of the pixel. This may be measured on a scale of, e.g., 0 to 255. Alternatively, in colour images, the pixel value may comprise three values representing the RGB values of the pixel (which may also be on a scale of 0 to 255). Other three value representations may be used, such as a hue, saturation, [intensity, value, brightness, or luminance] representation, or a YCbCr representation. It will be appreciated that the pixel value represents a property of the pixel, be it the brightness or the colour (or both). The step of obtaining a plurality of segmentation masks typically includes: obtaining a first segmentation mask corresponding to the first image, and obtaining a second segmentation mask corresponding to the second image. Then, generating the plurality of simulated combination images may comprise combining the first image and the second image. And, generating the simulated segmentation mask may comprise combining the first segmentation mask with the second segmentation mask.

Combining the first image and the second image to generate the simulated combination image may be achieved in a number of ways. Specifically, combining the first image and the second image may comprise: for each pixel of the first image, combining the value of that pixel with the pixel value of the corresponding pixel in the second image to obtain the corresponding pixel of the simulated image. This combination may be a straightforward additive combination, or an average of the two pixel values may be taken. However, the inventors have identified two ways of combining the pixel values which yield more effective results than the additive combination or average methods.

Firstly, in some cases, combining the pixel values of the first image with the pixel values of the corresponding pixels of the second image comprises selecting the minimum pixel value of the two pixel values and using that minimum pixel value for the corresponding pixel value of the simulated image. Specifically, the "minimum pixel value" here refers to the minimum brightness or minimum intensity pixel value. Accordingly, in cases where the pixel value does not explicitly include an intensity pixel value (e.g., where the pixel value comprises an RGB representation of the colour of the pixel), this step may further include a sub-step of deriving an intensity value of the pixels in question, before selecting the minimum value of the two. This step may be performed on each of the three image channels separately, e.g., to give rise to a minimum pixel having values of $[\min(r_1,r_2), \min(g_1,g_2), \min(b_1,b_2)]$ when the channels represent the RGB values. It will be appreciated that other types of image channels may be used. This method of combining pixel values has been shown to be particularly effective.

In alternative cases, combining the pixel values of the first image with the pixel values of the corresponding pixels of the second image comprises adding an absorbance value of the pixel of the first image to an absorbance value of the corresponding pixel of the second image; calculating the exponent of the result of the addition; and using the calculated exponent as the pixel value for the corresponding pixel of the simulated image. This method of combining pixel values has also been shown to be particularly effective. Again, as in the previous paragraph, if the pixel values of the first image and the second image do not include an absorbance value, this step may further include a sub-step of deriving an absorbance value of the pixels in question, before adding the absorbance values together.

We now discuss the nature of the segmentation masks and the combination thereof in more detail. The segmentation masks may include a plurality of pixels, each pixel having a mask pixel value indicative of a class in which that pixel belongs. The classes may include: a background class (e.g., a mask pixel value of one of 0 or 1) indicating that there is no particle present in that pixel, or a particle class (e.g., the other mask pixel value of 0 or 1) indicating that there is a particle present in that pixel. Combining the first segmentation mask with the second segmentation mask may comprise combining a mask pixel value of a pixel of the first segmentation mask with a mask pixel value of a corresponding pixel of the second segmentation mask to determine a mask pixel value of the corresponding pixel of the simulated segmentation mask, the mask pixel value of the simulated segmentation mask indicative of a class to which that pixel of the simulated segmentation mask belongs. Since the first segmentation mask and the second segmentation mask are typically binary segmentation masks, it will be appreciated that the process of combining the segmentation masks is a straightforward one which is less labour intensive than, e.g., manually identifying overlap regions in images containing overlapping particles.

Where the first segmentation mask and the second segmentation mask are binary masks, it will be appreciated that the simulated segmentation has three classes: combining a pixel in the background class with another pixel in the background class may yield a pixel in a background class; combining a pixel in the background class with a pixel in the particle class yields a pixel in a non-overlapping pixel class; and combining a pixel in the particle class with another pixel in the particle class yields a particle in an overlapping particles class. These classes may correspond to specific mask pixel values. For example, in the first segmentation mask and the second segmentation mask: a mask pixel value of 0 may correspond to the background class; a mask pixel value of 1 may correspond to the particle class. In the simulated segmentation mask: a mask pixel value of 0 may correspond to the background class; a mask pixel value of 1 may correspond to the non-overlapping particle class; and a mask pixel value of 2 may correspond to the overlapping particle class. This indicates how straightforward the processing is here, leading to great improvements in efficiency.

The present disclosure can be used in many applications. Specifically, although its use in the analysis of histological images is beneficial, other uses are also envisaged. The particles may include one or more of the following: red blood cells; white blood cells; nanoparticles; organelles; tumour cells; circulating tumour cells; bone marrow cells; pathogenic cells, or mixtures of pathogenic cells with healthy cells; stem cells; bacteria; yeast; microparticles; bacteriophages; beads; fluorescent objects; phosphorescent objects; or translucent objects.

In some cases, it may be challenging to simulate the appearance of real overlapping particles realistically by combining them in the manner described hitherto. It is important for the training data to contain images showing the same types of particles as the machine learning model will ultimately be used to process. In other words, the style of the simulated image may be different from the style of the images which the machine learning model will ultimately be used to analyse. This issue may be addressed by using a style transfer algorithm.

The conversion may take place as follows:

In one case, the acquired plurality of images may be in a first style which is different from the style of image which the machine learning model will ultimately be used to analyse. Then, the method may further include a step of converting each of the acquired plurality of images to a converted plurality of images in a second style, the second style being the style of the images which the machine learning model will ultimately be used to analyse. Then, the subsequent steps of the method may be performed as normal on the converted plurality of images, rather than the acquired plurality of images.

The conversion may take place after the generation of the simulated combination images. Specifically, after generating the plurality of simulated combination images, the plurality of simulated combination images being in a first style the method may comprise converting each of the simulated combination images to generate a respective plurality of converted simulated combination images in a second style, the second style being the style of the images which the machine learning model will ultimately be used to analyse.

In some cases, both of the above processes may take place. For example, the acquired plurality of combination images may be converted to the second style for the purposes of generating the segmentation masks. However, the original (first style) images may be combined to generate the simulated combination images, which themselves may (separately) be converted into the second style.

Here, the term "style" may refer to the general appearance of the particles in the image. Style transfer algorithms have been developed which allow one, e.g., to convert images of winter landscapes into their equivalent summer version, or to generate a picture of how someone will look when they are older. In the context of the present disclosure, the style transfer algorithms are used to convert simulated images of overlapping objects that fail exactly to capture the statistical properties exhibited by real images of those overlapping objections, into realistic looking images that will benefit the training of the algorithms.

Typically, converting the images in question from the first style to the second style comprises applying a style transfer algorithm to the images. Specifically, either the acquired plurality of images or the plurality of simulated combination of images may be input into a style transfer algorithm. The style transfer algorithm may be a machine learning algorithm, typically involving a convolutional neural network or a generative adversarial neural network (GAN). Appropriate style transfer algorithms are discussed in Leon A. Gatys, Alexander S. Ecker, Matthias Bethge, Proceedings of the IEEE Conference on Computer Vision and Pattern Recognition (CVPR), 2016, pp. 2414-2423; Li, Yijun, et al. "Universal style transfer via feature transforms." arXiv preprint arXiv:1705.08086 (2017); Praramadhan, Anugrah Akbar et al. "Cycle Generative Adversarial Networks Algorithm With Style Transfer For Image Generation" arXiv: 2101.03921 (2021); Tero Karras, Samuli Lane, Miika Aittala, Janne Hellsten, Jaakko Lehtinen, Timo Aila, Proceedings of the IEEE/CVF Conference on Computer Vision and Pattern Recognition (CVPR), 2020, pp. 8110-8119.

The above features relate to the generation of training data for a machine learning model. A second aspect of the present disclosure provides a computer-implemented method of generating a machine learning model for generating a segmentation mask for an image containing overlapping particles, the method comprising the steps of: providing a machine learning algorithm; receiving training data generated by the computer-implemented method of the first aspect of the present disclosure; and training the machine learning algorithm using the received training data, to generate the trained machine learning model. In some cases, the provided machine learning algorithm may be a deep learning segmentation algorithm. One type of deep learning segmentation algorithm which is particular beneficial for the present disclosure is a U-net algorithm as described in Olaf Ronneberger, Philipp Fischer, Thomas Brox, Medical Image Computing and Computer-Assisted Intervention (MICCAI), Springer, LNCS, Vol. 9351: 234-241, 2015, or any similar segmentation algorithm or encoder-decoder architecture which allows for the classification of individual pixels. Alternatively, bounding boxes for the overlap regions could be identified using a deep learning algorithm such as a YOLO ("you only look once") algorithm, in which case bounding boxes may be simply derived from segmentation masks by taking the extreme points of the segmentation masks.

In some cases, the machine learning algorithm or deep learning algorithm may include a weighted cross-entropy loss function. This is useful in addressing the dataset imbalance, arising because there is likely to be more background in the images than particles and more area occupied by particles than area occupied by overlapping particles. Specifically, the weights of the weighted cross-entropy loss function may be determined using the following steps: sampling n simulated segmentation masks from the received training data; for each mask, calculating the sum of the pixels in each pixel class; dividing the calculated sum by the total number of pixels in the simulated segmentation mask and taking an average over the n simulated segmentation masks, and using the inverse of those values.

The computer-implemented method may further include augmenting the received training data. The term augmenting is well-known in the art to refer to the enlargement of the data set, which provides for a greater amount of training data, and therefore a machine learning model which is more thoroughly trained for a given amount of input images. Alternatively, augmentation means that a model can be well-trained using only a small initial data set. Augmentation may take place at two different stages: before combination of the images to generate the simulated combination images; and at the final stage. These are discussed in turn.

The computer-implemented method may further comprise a step of generating an augmented plurality of images from the acquired plurality of images. Generating the augmented plurality of images may comprises applying one or more transformations to each image of the acquired plurality of images, each transformation resulting in a respective transformed image. Here, a transformation may be a rotation, a translation, a reflection, or a scaling. In a typical case, two transformed images may be generated from a given image by applying a vertical flip, and (separately) a horizontal flip. This effectively triples the number of images from which simulated combination images may be generated, and therefore vastly increases the number of simulated combination images which can be generated, and therefore the volume of training data generated using computer-implemented methods of the first aspect of the present disclosure. It should be noted that when the computer-implemented method includes this augmentation step, the simulated combination images are generated by combining images of the augmented plurality of images, and the plurality segmentation masks are obtained for respective images of the augmented plurality of acquired images.

In addition to this, the simulated combination images and the simulated segmentation masks can also be increased in volume by applying the same kinds of transformations to these, thereby including further augmentation at the final stage. Specifically, one or more transformations may be applied to each simulated combination image, to generate one or more respective transformed simulated combination images. The same can be done to the simulated segmentation masks, to generate respective transformed segmentation masks. Each transformed simulated segmentation mask can then be associated with the corresponding transformed simulated combination image. This provides an additional increase in the volume of training data.

Above, we have described a process by which training data is generated, and how that training data is used to generate a machine learning model. Accordingly, a third aspect of the present disclosure provides a computer-implemented method of generating a segmentation mask of an image containing overlapping particles, the method comprising the steps of: receiving an image including overlapping particles; and applying a machine learning model to the received image, the machine learning model generated using the computer-implemented method of the second aspect of the present disclosure, and configured to generate a segmentation mask based on the received image, the segmentation mask indicating regions of the image which contain overlapping particles. The computer-implemented may further comprise a step of displaying the output, i.e., the segmentation mask. Specifically, in response to the generation of the segmentation mask, the computer-implemented method may further include a step of generating computer-readable instructions which, when received by a computer or the like, cause the computer to display the segmentation mask on a display component.

As we have explained, machine learning models which are generated based on the large volumes of training data according to the first aspect of the present disclosure are necessarily more effective, and are able to provide more accurate segmentation masks, which more accurately indicate the shapes of the overlapping regions of particles. This is advantageous, since the improved accuracy with which particle shape can be identified (even when the particles overlap) leads to an improvement in the ability to classify the particles based on their shape, size, and/or volume. This is of particular importance when the segmentation masks are generated for images showing populations of overlapping cells. The ability automatically and reliably to classify cells based on their size, shape, and/or volume, as well as any other spatial or structural characteristics can lead to improvement in, e.g., diagnostics.

The computer-implemented present disclosure may further include a step of determining the characteristics of one or more of the particles in the generated segmentation mask. Herein the characteristics may include size, shape, area, haemoglobin content and/or volume. Typically, the characteristics of a plurality, or of all of the particles may be determined.

A fourth aspect of the present disclosure may provide a computer-implemented method of automatically classifying particles in an image including overlapping particles, the computer-implemented method including generating a segmentation mask of the image according to the computer-implemented method of the third aspect of the present disclosure; and determining a class of at least one of the particles in the segmentation mask based on one or more of the shape, size and/or volume of the particle. Typically, the computer-implemented method of determining a class of at least one of the particles comprises determining a class of a plurality of particles in the image, more typically all of the particles in the image. In some cases, only the classes of whole particles in the image may be determined. Determining the class may comprise determining the characteristics of the particle, and subsequently grouping the particles based on the determined characteristics. Computer-implemented methods according to the fourth aspect of the present disclosure typically relate to images in which the particles are cells (types of which have been listed earlier in the application). One particularly beneficial application of the computer-implemented method of the fourth aspect of the present disclosure is the diagnosis of thalassemia, a blood disorder in which a patient's haemoglobin level is reduced relative to normal. Diagnosis of thalassemia using known methods may fail because of defective red blood cell segmentation, as a result of overlapping. This could then lead to underestimation of the volume of the red blood cells. The present disclosure addresses these issues.

The first to fourth aspects of the present disclosure which have been defined above all relate to computer-implemented methods. However, other aspects of the present disclosure are also envisaged. A further aspect of the present disclosure provides a computer program comprising instructions which, when the program is executed by a computer, cause the computer (or specifically, a processor thereof) to carry out the method of any of the first to fourth aspects of the present disclosure. Another aspect of the present disclosure provides a computer-readable data carrier having stored thereon the computer program of the previous aspect of the present disclosure. Another aspect of the present disclosure provides a system comprising a processor which is configured to perform the computer-implemented method of any one of the first to fourth aspects of the present disclosure.

The present disclosure includes the combination of the aspects and typical features described except where such a combination is clearly impermissible or expressly avoided.

In order that embodiments of the present disclosure may be more readily understood, reference is made to the following examples, which are intended to illustrate the disclosure, but not limit the scope thereof. All documents mentioned in this text are incorporated herein by reference.

FIG. 1 shows an example of a system 100 which may be used to execute the computer-implemented method of the first, second, third, and fourth aspects of the present disclosure. It will be appreciated by the skilled person that this is merely an example of a system, and that the components of such a system could readily be reorganized as appropriate. Such reorganized versions of system 100 should also be considered covered by the present disclosure. The system 100 includes a client device 102, an image capture device 103 and an image processing system 104, which are connected via a network 106. The network 106 may be in the form of a wired network, or a wireless network, such as a Wi-Fi network, or a cellular network. The system 100 may be in the form of a local area network (LAN) or a wide area network (WAN). In typical cases, the client device 102, and the image capture device 103 are connected to the image processing system 104 via the internet. In an alternative arrangement (not shown), the functionality of the client device 102 and the image processing system 104 may be provided on the same computer, which may be connected directly to the image capture device 103. Herein, the term "computer" should be understood to cover conventional desktop computers, laptop computers, tablets, smartphones, or any other kind of computing device of which the skilled person is aware. Throughout this application, we refer to various functional "modules": these modules may be in the form of physical hardware modules, or software modules which are implemented in code. The modules may be a combination of hardware and software modules. In the context of the present disclosure, the client device 102 is a user device via which a user may upload an image (containing overlapping particles) in order to obtain a segmentation mask using the computer-implemented method of the third aspect of the present disclosure. The image capture device 103 may comprise a camera, which may be connected, for example, to a microscope (not shown) or any other laboratory equipment which is adapted to obtaining images of particles which may not be visible to the naked eye. In some cases (also not shown) the client device 102 may include the image capture device 103.

Figure 2:
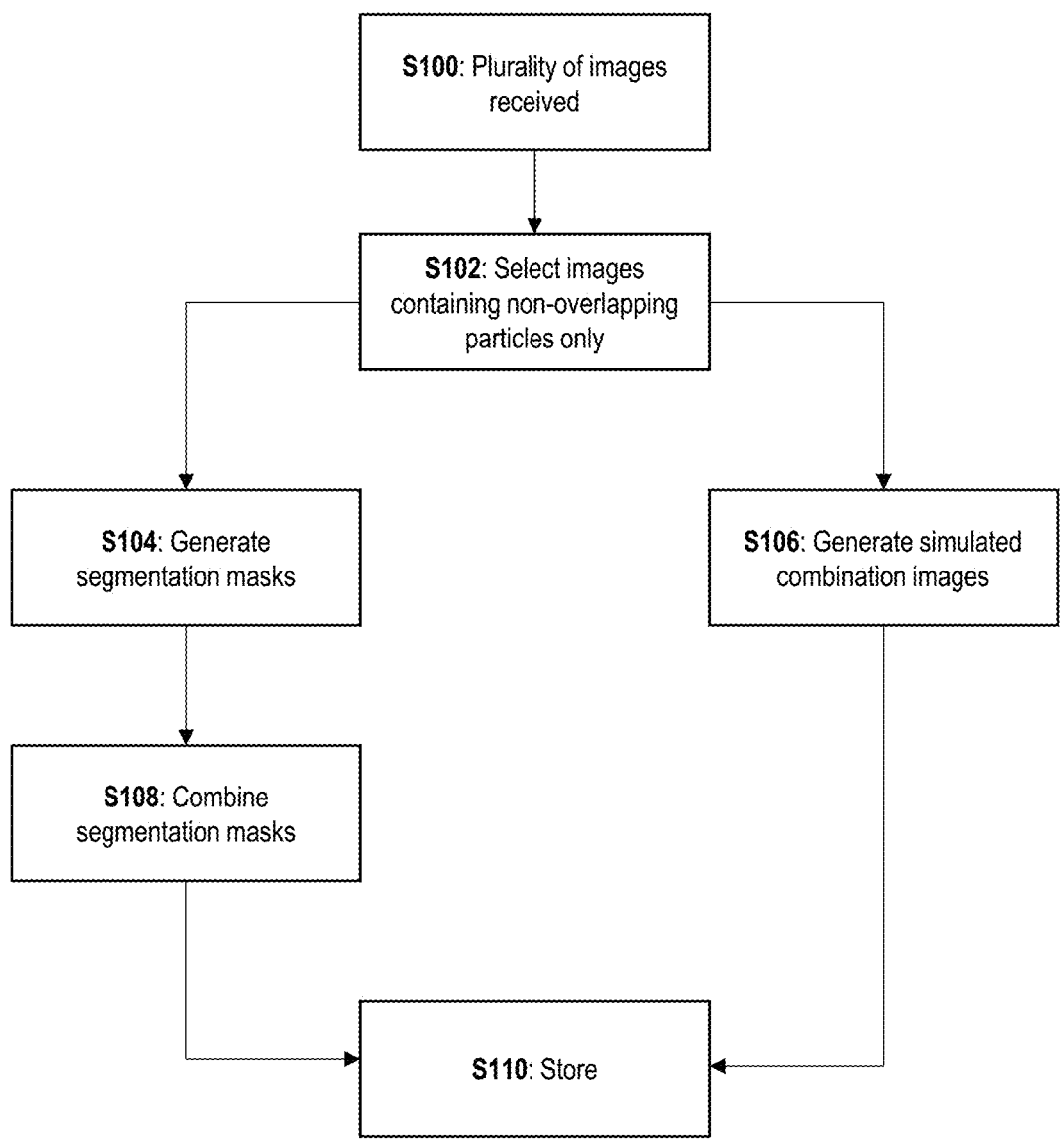
FIG. 2 shows an example of a computer-implemented method according to an embodiment of the present disclosure.

We now describe the structure of the system 100 in more detail before explaining the operation of the system 100 with respect to the flowchart of FIG. 2. The image processing system 104 includes a client interface module 107, a processor 108, an image capture device interface module 109 and a memory 110. The processor 108 includes a plurality of functional modules including a machine learning model training module 111 which includes a training data generation module 112 comprising: an image filtering module 113, a segmentation module 114, a data augmentation module 115, an image combination module 116, a simulated segmentation mask generation module 118, and a style transfer module 120. The machine learning model training module 111 further includes a training module 119. The processor 104 further includes a segmentation mask generation module 122, a feature extraction module 124, and a classification module 126. The memory 110 includes a machine learning model 128, a buffer 130, and a database of training data 132. The function of each of the modules mentioned in the preceding paragraph is apparent to the skilled person, but for completeness, we now describe the operation of the system in detail with reference to FIGS. 2 and 3A to 3E.

Figure 3A:
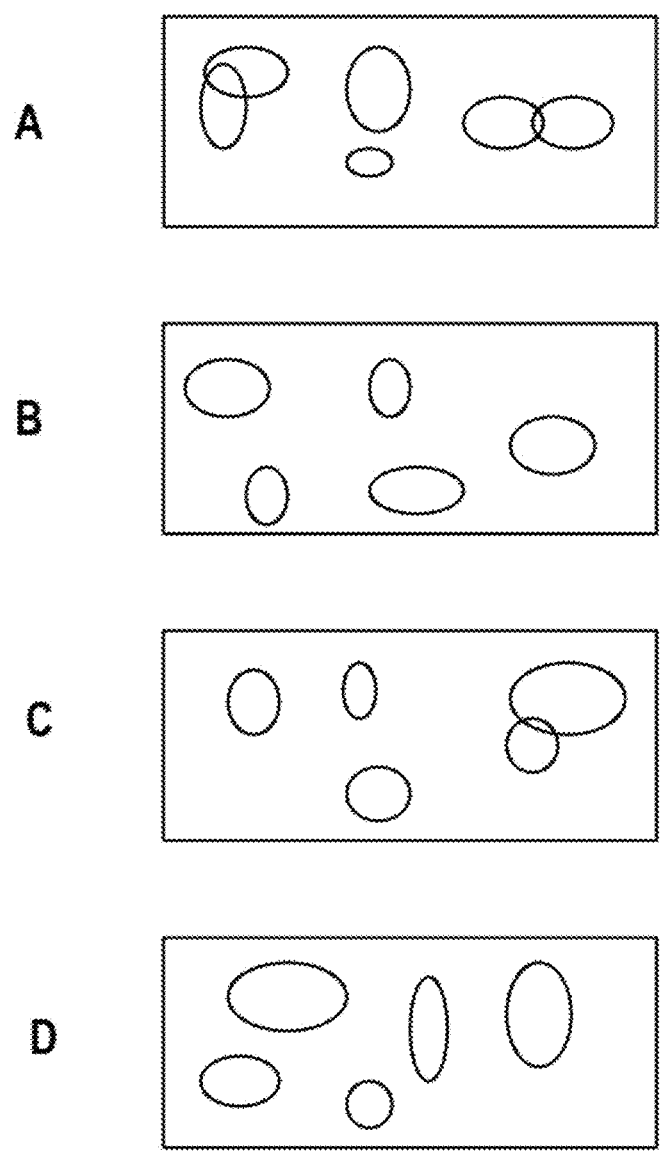
FIGS. 3A to 3E show a series of images which represent various stages in the method of FIG. 2 according to an embodiment of the present disclosure.

FIGS. 2 and 3A to 3E represent an example computer-implemented method according to the first aspect of the present disclosure, i.e., a computer-implemented method for generating training data to be used to train a machine learning model for generating a segmentation mask of an image containing overlapping particles. In the example shown, the computer-implemented method represented in FIG. 2 is executed by the training data generation module 112 of the machine learning model training module 111:

In a first step S100, a plurality of images is acquired. For example, a plurality of images may be received from image capture device 103 or client device 102, via the network, and the image capture device interface module 109 or client device interface module 107, respectively. Alternatively, the plurality of images may be downloaded from a database, or other source. The means by which the plurality of images is acquired in step S100 is not central to the present disclosure, and the skilled person will readily appreciate that there are many ways in which they may be obtained. The images of the plurality of images typically include relatively sparse populations of particles, as illustrated in FIG. 3A. FIG. 3A shows four example images A, B, C, D, each containing sparse populations of particles. It will be appreciated that FIGS. 3A to 3E show schematic versions of images, and when being implemented, the images would typically show the kind of particles on which the machine learning model 128 is ultimately to be used.

Figure 3B:
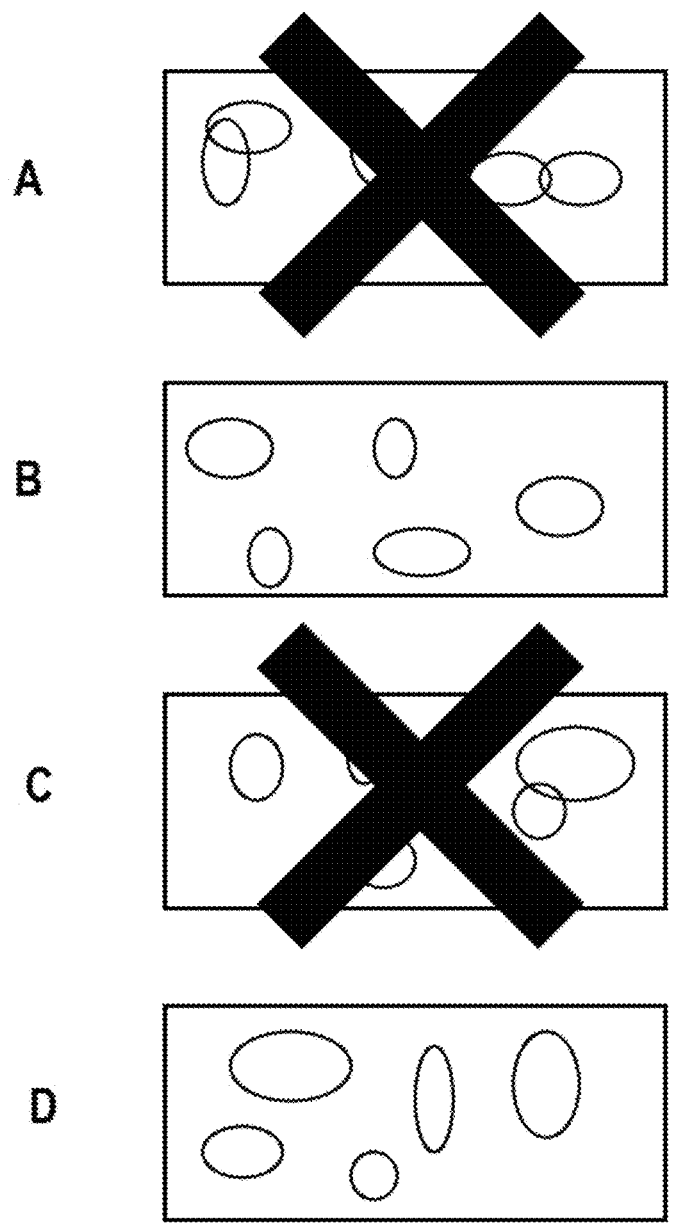

The machine learning model 128 is typically trained using images which contain non-overlapping particles. In order to ensure that this is the case, in step S102, only those images containing only non-overlapping particles are selected. This may be done automatically using the image filtering module 113. Alternatively, a user may select the appropriate images manually (which may be facilitated using the image filtering module 112). As shown in FIG. 3B, only images B and D are selected, since images A and C (see FIG. 3A) include overlapping pairs of particles (labelled "O").

Figure 3C:
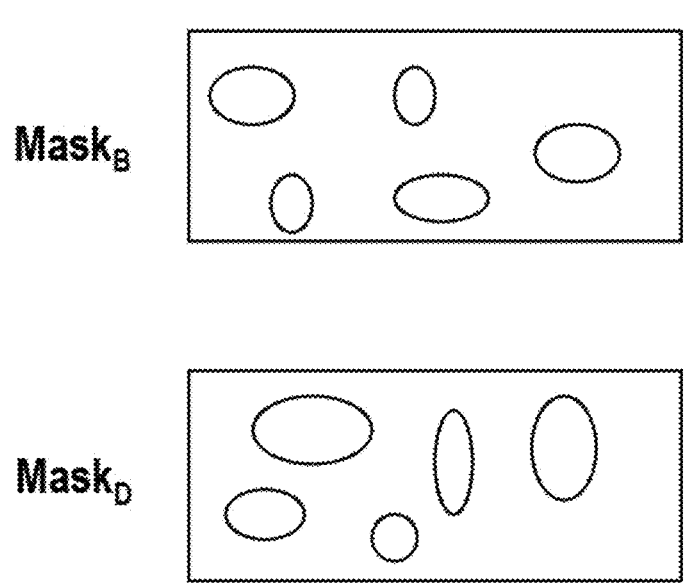

Now that only images containing non-overlapping particles only have been selected in step S102, the segmentation module 114 is used to generate a segmentation mask for each of the plurality of selected images in step S104. It should be noted that because the selected images contain only non-overlapping particles, the generation of the segmentation mask is relatively straightforward (i.e., it may be done using conventional segmentation algorithms, such as thresholding, edge-detection and watershed methods, all of which are well-known to the skilled person). FIG. 3C shows an example of the segmentation masks generated from images B and D. These are binary masks in which regions where a particle is present are shown in black, and background regions are shown in white. In reality, the segmentation mask would comprise an array of pixels, each having a value of 0 or 1 depending on whether a particle is present or not.

Figure 3D:
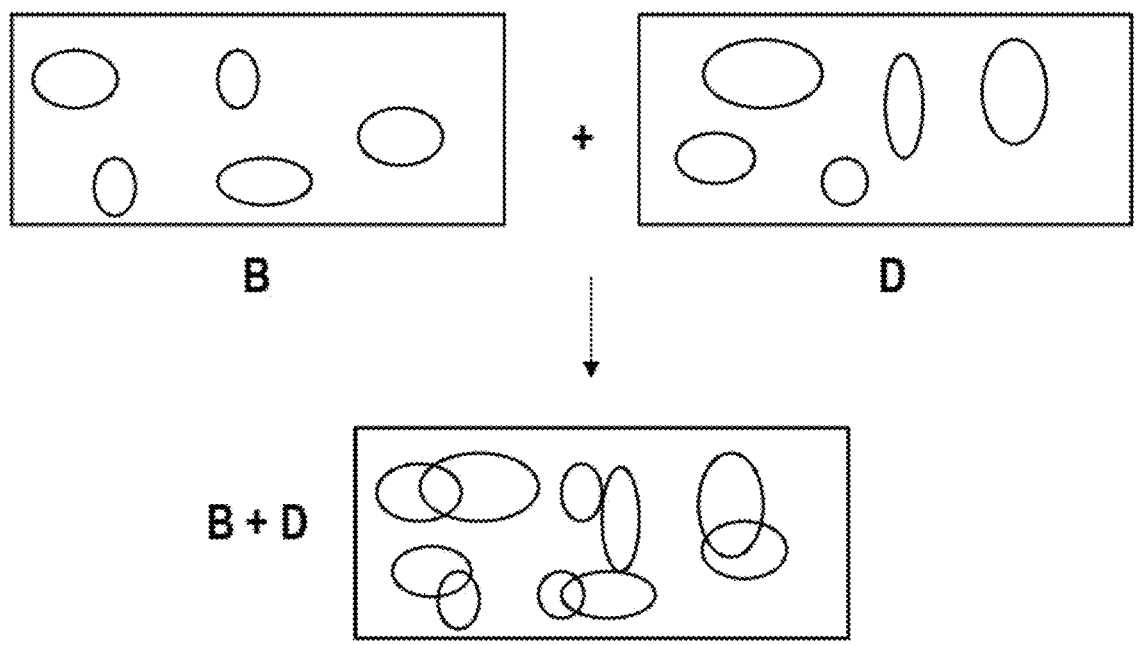

In step S106 (which may happen in parallel with step S104, as illustrated), pairs of the selected plurality of images are combined, using image combination module 116, to generate a plurality of simulated combination images containing overlapping particles. Ways in which the images may be combined (e.g., by selecting a minimum pixel intensity value) are explained earlier in this application. FIG. 3D shows a schematic example of a simulated combination image which may be produced. At this point, it is worth discussing the operation of the style transfer module 120. The more similar the training images are to the images on which the machine learning model 128 will ultimately be used, the more effective the machine learning model 128 will ultimately prove to be. In view of this, it may be desirable to convert the "raw" training images into images having the same style as the images on which the machine learning model 128 will ultimately be used. In order to achieve this, the style transfer module 120 may be used to, e.g., convert the selected images, or the simulated combination images into converted images which are in the desired style. This may take place, e.g., between steps S102 and S104, or after step S106—or both. Examples of style transfer algorithms which may be executed by the style transfer module 120 are referenced elsewhere in this application.

Figure 3E:
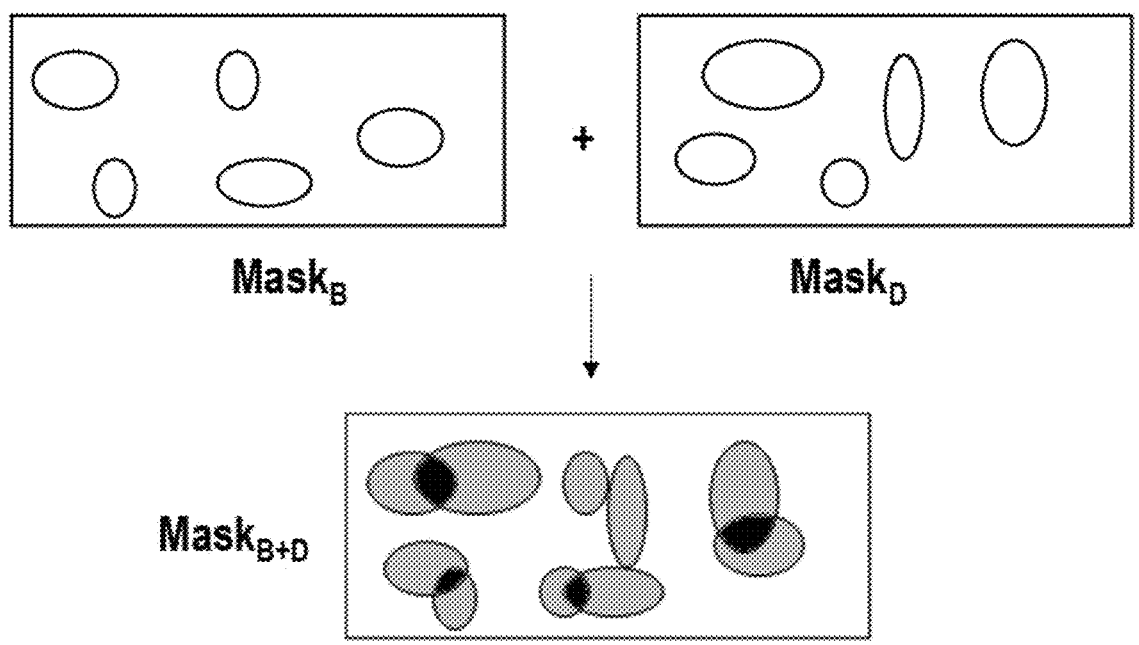

In step S108 which may take place in parallel with step S106, simulated segmentation masks are generated by combining individual segmentation masks, by the simulated segmentation mask generation module 118. The resulting segmentation masks may take three values, indicating a background, a non-overlapping particle region, and an overlapping particle region. An example is shown in FIG. 3E, in which the two masks of FIG. 3C are combined. The background region is shown in white, the non-overlapping particle regions are shown in grey, and the overlapping particle regions are shown in black. Specifically, pairs of segmentation masks corresponding to the pair of selected images forming each simulated combination image are combined, so that a simulated segmentation mask exists corresponding to each simulated combination image.

Finally, in step S110, each simulated combination image is stored in combination with its respective simulated segmentation mask in the database of training data 132. At this point, the training data 132 comprises unlabelled input data (i.e., the simulated combination images) and labelled output data (i.e., the simulated segmentation masks).

After the training data 132 is generated, according to the computer-implemented method of the second aspect of the present disclosure, the machine learning algorithm may be trained using the training data 132 by the training module 119 in order to generate the trained machine learning model 128.

Figure 4:
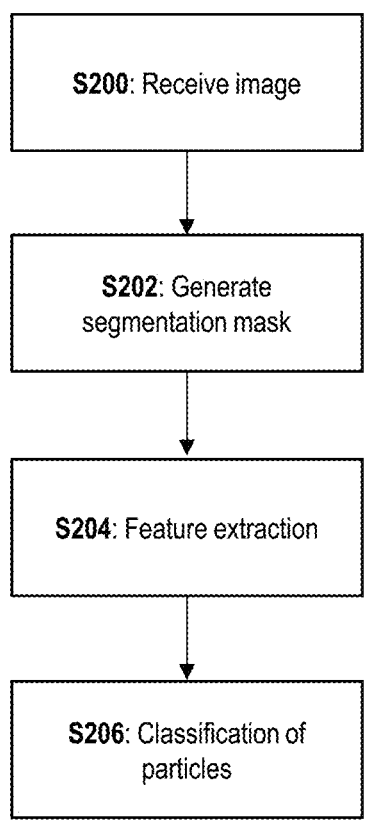
FIG. 4 shows a series of steps by which particles in an image containing overlapping particles may be classified according to the computer-implemented method according to an embodiment of the present disclosure.

The third and fourth aspects of the present disclosure provide computer-implemented methods, respectively, for generating a segmentation mask from an image containing overlapping particles, and automatically classifying particles in an image including overlapping particles. FIG. 4 is a flowchart of a computer-implemented method which covers both the third and fourth aspects of the present disclosure:

In step S200, an image containing overlapping particles is received at the image processing system 104, e.g., from the client device 102 via the client device interface module 107, or from the image capture device 103 via the image capture device interface module 109.

In step S202, the generated machine learning model 128 is applied to the received image, thereby generating a segmentation mask. It should be noted that throughout the present application, segmentation masks typically include outlines of the plurality of particles within the image. Where there is overlap between particles, by virtue of its training, the machine learning model 128 is able to predict or extrapolate the likely outlines of particles even where portions of the outline are obscured by the overlapping particles. The effectiveness of the computer-implemented methods of the present disclosure is demonstrated later in this application.

In step S204, after the segmentation mask has been generated, the feature extraction module 124 may be used to extract features from the segmentation mask, such as particle shapes, particle sizes, particle volumes. Other relevant descriptors may be found online (see, https://www.mathworks.com/help/images/ref/regionprops.html for some additional examples of descriptors. When a deep learning model is used for the classification, manual feature extraction is not necessary, since the model may be trained directly on the images and segmentation masks.

Finally, in step S206, the classification module 126 may be used to classify the particles (i.e., to put them into one of a plurality of classes), based on the extracted features. In some cases, step S206 may follow straight on from step S202 (i.e., the classification may take place directly based on the segmentation mask, rather than the feature extraction step explicitly taking place).

Figure 5:
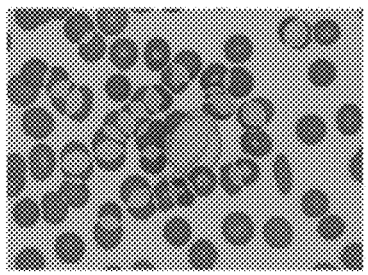
FIGS. 5, 6A and 6B show examples of results which may be obtained using the computer-implemented method according to an embodiment of the present disclosure.
Figure 5:
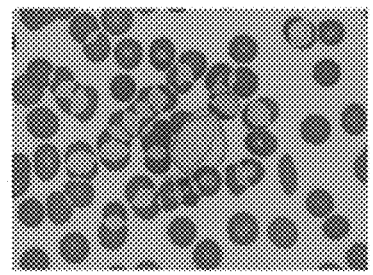
Figure 5:
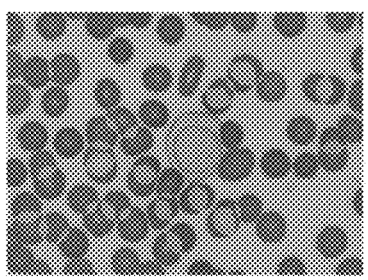
Figure 5:
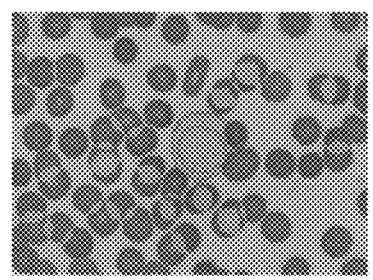
Figure 5:
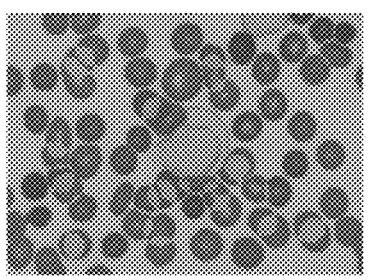
Figure 5:
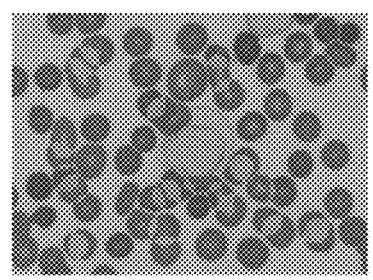
Figure 5:
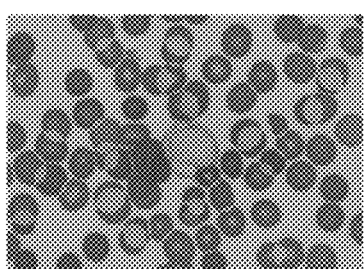
Figure 5:
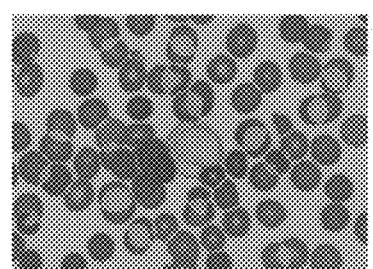
Figure 6A:
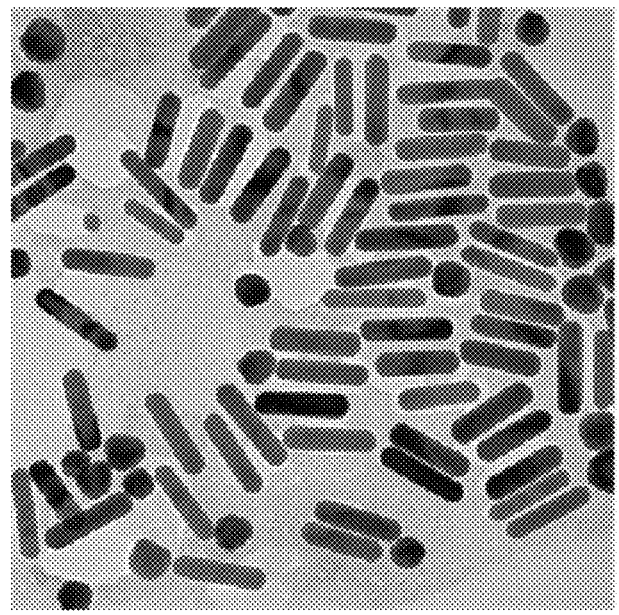
Figure 6B:
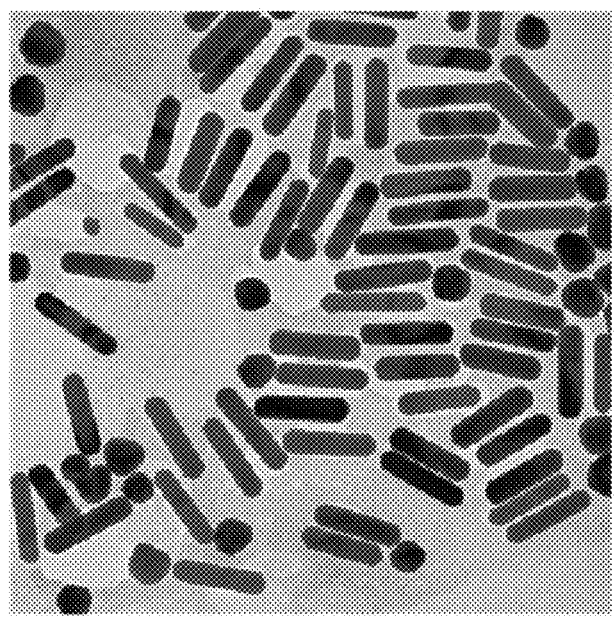

FIG. 5 highlights the effectiveness of machine learning models which are generated using the computer-implemented method of, e.g., the second aspect of the present disclosure. The left column shows ground truth images, i.e., a "correct" segmentation mask obtained for an image of a population of cells which includes overlapping cells. The overlapping regions are shown in a lighter shade. The right column shows the results of the application of a machine learning model as trained according to the second aspect of the present disclosure on the same images. It will be appreciated that the shapes of the overlapping regions are virtually identical, thereby indicating that the present disclosure is able to facilitate the production of highly accurate segmentation masks. FIGS. 6A and 6B also demonstrate the effectiveness of the method, except for nanoparticles rather than populations of cells.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

What is claimed is:

1. A computer-implemented method of generating training data to be used to train a machine learning model for generating a segmentation mask of an image containing overlapping particles, the method comprising:
   acquiring a plurality of images containing non-overlapping particles;
   obtaining a plurality of segmentation masks, each segmentation mask corresponding to a respective image of the plurality of images;
   generating a plurality of simulated combination images by combining images of the plurality of images, the simulated combination images including overlapping particles; and
   for each simulated combination image, generating a respective simulated segmentation mask by combining the segmentation masks obtained for each of the constituent images which were combined to generate that simulated combination image;
   wherein the machine learning model is a deep learning segmentation algorithm.

2. The computer-implemented method of claim 1, wherein:
the plurality of images includes a first image and a second image, each image being made up of an array of pixels, each pixel having an associated pixel value indicative of a property of that pixel;
obtaining the plurality of segmentation masks includes:
obtaining a first segmentation mask corresponding to the first image; and
obtaining a second segmentation mask corresponding to the second image;
generating the plurality of simulated combination images comprises combining the first image and the second image; and
generating the plurality of simulated segmentation masks comprises combining the first segmentation mask with the second segmentation mask.

3. The computer-implemented method of claim 2, wherein:
combining the first image and the second image comprises, for each pixel of the first image, combining the pixel value of that pixel with the pixel value of the corresponding pixel of a second image to obtain the pixel value for the corresponding pixel of the simulated image.

4. The computer-implemented method of claim 3, wherein:
combining the pixel values of the pixel of the first image with the pixel value or the corresponding pixel of the second image comprises selecting the minimum pixel value of the two pixel values and using that minimum value as the pixel value for the corresponding pixel of the simulated image.

5. The computer-implemented method of claim 4, wherein:
the segmentation masks include a plurality of pixels, each pixel having a mask pixel value indicative of a class in which that pixel belongs, the classes including:
a background class indicating that there no particle present in that pixel; and
a particle class indicating that there is a particle present in that pixel.

6. The computer-implemented method of claim 5, wherein:
combining the first segmentation mask with the second segmentation mask comprises: combining a pixel value of a pixel of the first segmentation mask with a pixel value of a corresponding pixel of the second segmentation mask to determine a pixel value of the corresponding pixel of the simulated segmentation mask, the pixel value of the simulated segmentation mask indicative of a class to which that pixel of the simulated segmentation mask belongs.

7. The computer-implemented method of claim 6, wherein:
combining a pixel in the background class with another pixel in the background class yields a pixel in a background class;
combining a pixel in the background class a pixel in the particle class yields a pixel in a non-overlapping particle class; and
combining a pixel in the particle class with another pixel in the particle class yields a pixel in the overlapping particles class.

8. The computer-implemented method of claim 7, wherein:
the plurality of simulated combination images is in a first style; and
the method further comprises a step of converting each of the plurality of simulated combination images to generate a respective plurality of converted simulated combination images in a second style, the second style being the style of the images which the machine learning model will ultimately be used to analyse.

9. The computer-implemented method of claim 8, wherein:
converting the generated plurality of simulated combination images from the first style to the second style comprises applying a style transfer algorithm to each of the plurality of simulated combination images.

10. The computer-implemented method of claim 9, wherein:
the particles include one or more of the following: red blood cells; white blood cells; nanoparticles; organelles; tumour cells; circulating tumour cells; bone marrow cells; pathogenic cells, or mixtures of pathogenic cells with healthy cells; stem cells; bacteria; yeast; microparticles; bacteriophages; beads; fluorescent objections; phosphorescent objects; or translucent objects.

11. A computer-implemented method of generating a machine learning model for generating a segmentation mask for an image containing overlapping particles, the method comprising the steps of:
providing a machine learning algorithm;
receiving training data generated using the computer-implemented method of claim 1; and
training the machine learning algorithm using the received training data, to generate the trained machine learning model;
wherein the machine learning algorithm is a deep learning segmentation algorithm.

12. The computer-implemented method of claim 11, wherein:
the machine learning algorithm includes a weighted cross-entropy loss function.

13. The computer-implemented method of claim 12, wherein:
the weights of the weighted cross-entropy loss function are determined using the following steps:
sampling n simulated segmentation masks from the received training data;
for each mask, calculating the sum of pixels in each pixel class;
dividing the calculated sum by the total number of pixels in the mask;
taking an average over the n simulated segmentation masks; and
using the inverse of those values as the weights of the weighted cross-entropy loss function.

14. A computer-implemented method of generating a segmentation mask of an image containing overlapping particles, the method comprising the steps of:
receiving an image including overlapping particles;
applying a machine learning model to the received image, the machine learning model generated using the computer-implemented method of claim 11, and configured to generate a segmentation mask based on the received image, the segmentation mask indicating regions of the image which contain overlapping particles;

wherein the machine learning model is a deep learning segmentation algorithm.

15. A system for generating a segmentation mask of an image including overlapping particles, the system configured to perform the method of claim 14.

* * * * *